(No Model.)
W. G. & B. W. KING.
OPERA GLASSES.
No. 590,549. Patented Sept. 21, 1897.
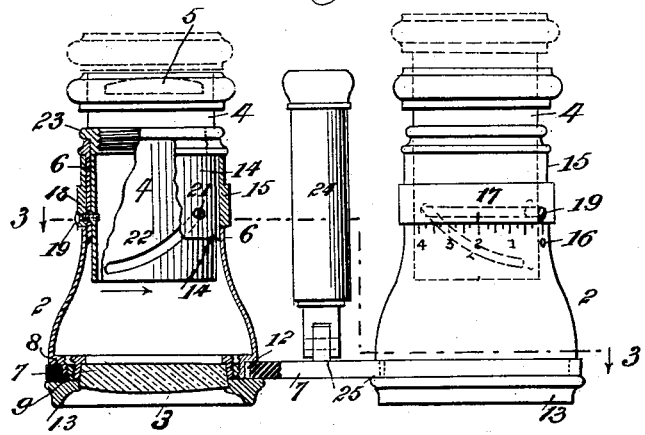
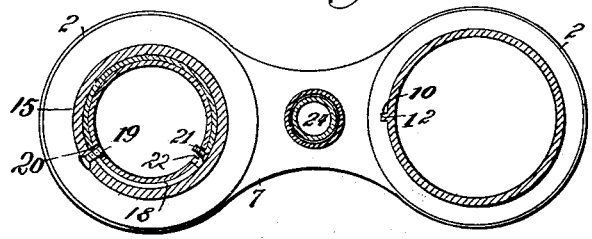
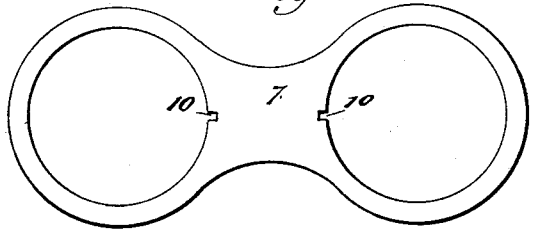
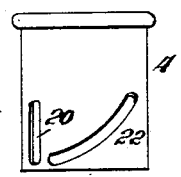
INVENTORS:
Walter G. King,
Burnham W. King
BY H. Albertus Heat
ATTORNEYS.
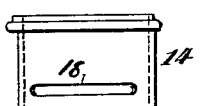
WITNESSES:
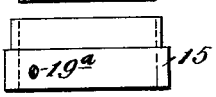
THE NORRIS PETERS CO., PHOTO-LITHO., WASHINGTON, D. C.

UNITED STATES PATENT OFFICE.

WALTER G. KING AND BURNHAM W. KING, OF NEW YORK, N. Y.

OPERA-GLASS.

SPECIFICATION forming part of Letters Patent No. 590,549, dated September 21, 1897.

Application filed January 21, 1897. Serial No. 620,030. (No model.)

*To all whom it may concern:*

Be it known that we, WALTER G. KING and BURNHAM W. KING, citizens of the United States, and residents of New York, in the county of New York and State of New York, have invented certain new and useful Improvements in Opera-Glasses, of which the following is a specification.

Our invention relates to opera, field, and marine glasses, the object and nature of the invention being to provide glasses of binocular type having such construction that advantage is gained in cheapness of manufacture, in convenience and facility of focusing the lenses differentially, if desired, and in holding the same in proper planes with each other, so that the refracted rays of light from the objectives will not be distorted by the ocular lenses. Advantage is also gained in the attachment of a handle and its convenient disposition when the opera-glass is not in use, and also in enabling the optician, by means of interchangeable yoke-pieces, to suit the lens barrels or tubes to the varying pupilary requirements of individuals.

In the accompanying drawings, to which reference is made and which form a part of this specification, Figure 1 is a sectional elevation of a pair of opera-glasses made in accordance with our invention, illustrating the differential focusing of the lenses and showing the handle folded. Fig. 2 is a sectional elevation of the same, showing the handle in position for use. Fig. 3 is a transverse sectional end elevation of the glasses on the line 3 3 of Fig. 1. Fig. 4 is a plan view of a yoke of less length than that shown in Fig. 3. Fig. 5 is a detailed view of the separate parts of one of the lens-tubes, and Fig. 6 shows a modification of the focusing mechanism.

In the drawings, 2 2 represent the main barrels or tubes for the objective lenses 3, and 4 4 represent sliding tubes for holding the ocular lenses 5 and for focusing them with the lenses 3. The said sliding tubes 4 4 have long bearings 6 in the ends of the barrels or tubes 2 2, which bearings are at right angles to the plane of the lenses 3 3, and said tubes are snugly embraced by said bearings, so that the said tubes cannot be deflected laterally and so that they constantly hold the ocular lenses 5 in perfect parallelism with the objective lenses 3. The said sliding tubes 4 4 are not yoked together, as in ordinary opera-glasses, for simultaneous adjustment, but are adapted to be adjusted independently of each other, so that each pair of lenses may be focused differently to correct any defect or differences of vision that may exist in the eyes of the particular user.

The main tubes or barrels 2 2 are attached to a single yoke 7. We do not limit ourselves to the means shown for connecting the said barrel to said yoke, as various means may be employed. The connection we prefer to employ is shown clearly in Fig. 1. The end of each barrel is offset or reduced to form a shoulder 8, which, together with the reduced portion 9, forms a seat for the ring of the yoke. A notch or detent 10 is formed in the ring to receive a complemental detent 12, so that the barrel cannot rotate. The interior of the flange or reduced portion 9 is screw-threaded, as shown, to receive the screw-threaded flange of the lens-bezel 13, which bezel also serves as a clamp for clamping the ring of the yoke 7 and the tube or barrel firmly together.

The barrels 2, in which the tubes 4 slide, are each provided at the ends with a fixed extension or reinforcing tube 14, which in the construction shown constitutes the above-mentioned bearings for the tubes 4, and each barrel is provided with a rotating ring 15 for focusing the lenses. These rings, in fact, form a part of the barrels and are so placed that the focusing may be easily and conveniently effected while the glasses are held up to the eyes by both hands of the user grasping the said rings. In this manner one hand complements the other and enables both rings to be turned conveniently at the same time, one more or less than the other, to gain the exact and proper focus for both eyes, or the focusing may be done as by an index 16 and line and point 17 on the barrel and ring, respectively, as shown at the right in Fig. 1.

18 represents a horizontal slot in each of the barrels 2 or reinforcing-piece 14 to receive a pin or stud 19, carried in an orifice 19ª in the focusing-ring 15. This said stud 19 reaches into a vertical slot 20 in the tube 4, so that the rotary movement of the rings 15 will be communicated to the tube 4. The barrel 2 or reinforcing-piece 14 is provided with a fixed stud 21, which reaches into a diagonal slot 22 in the tube 4, so that when said tube is rotated by the ring 15 the said tube will at the same time be moved out or in longitudinally for adjusting the lenses by the action of the diagonal 22.

We do not limit ourselves to this mechanism or movement for focusing the lenses, as various other devices may be employed for this purpose, all within the spirit of our invention—as, for example, the rings 15 might be omitted and the rings 4 might be turned directly by the hands of the user or the bezel 23 might be made to rotate for adjusting the tubes 4.

24 represents a telescopic handle which in this instance is hinged to the center of the yoke 7 by a suitable connection 25, so that said handle whether distended or closed may be folded back between the lens tubes or barrels, as shown in Figs. 1 and 3. When the handle is tipped down to position for holding the glasses up to the eyes, it is held in that position by a click or spring 26, bearing upon the squared portion of the smaller end of the handle, and this spring also serves to hold the handle in folded position. We do not limit ourselves to any special or particular means for attaching the handle to the yoke.

In Fig. 6 the sliding tubes 4 are held from rotating in the tubes 14 by means of a slot 27 and a lug 28, which enters said slot. The tubes are formed with a diagonal slot 29, and the ring 15 is furnished with a stud 30, which reaches through horizontal slots 31 in the tubes 14 and in the barrels 2, so that by turning said rings 15 the said studs 30, acting in the diagonal slots 29, will move the tubes 4 out or in for focusing the lenses.

Having thus described our invention, what we claim as new, and desire to secure by Letters Patent, is—

1. An opera or similar glass comprising a pair of lens-tubes for the ocular lenses, a pair of main barrels secured to a yoke for holding the objective lenses, and independent focusing mechanism connected in each of said barrels for adjusting the said lens-tubes; substantially as described.

2. An opera or similar glass comprising a pair of lens-tubes for the ocular lenses, a pair of main tubes or barrels for the objective lenses secured to a yoke, an independent exterior focusing device applied to each of the main barrels, and connected within the said barrels to the ocular-lens tubes; substantially as described.

3. An opera or similar glass comprising a pair of lens-tubes for the ocular lenses, a pair of main barrels for the objective lenses, and an independent rotary ring applied to the exterior of each of the said main barrels and connected to the ocular-lens tubes for adjusting them, substantially as described.

4. In an opera, or similar glass, the main barrels for the objective lenses provided with bearings at one end reaching to a point below the adjusting mechanism, tubes held to slide in said bearings, independent adjusting or focusing mechanism applied to said sliding tubes within said bearings, and exterior means for focusing the lenses; substantially as described.

5. In an opera, or similar glass, the main barrels 2, provided with focusing-rings 15, having studs 19 which reach through slots in the said barrels, in combination with the tubes 4, formed with vertical and diagonal slots 20, 22, and a fixed stud 21, which reaches into the said diagonal slot 22; substantially as described.

6. In an opera or similar glass, the main barrels 2, 2, provided with tubes 4, 4, and with means for adjusting said tubes and detachably connected to a yoke, in combination with detents 10, 12, or similar means for determining and maintaining the proper relative position of the barrels 2, 2 in the yoke and to each other; substantially as described.

7. In an opera or similar glass the main barrels secured to a single yoke, and independent means for focusing the lenses, in combination with a handle hinged to said yoke between the main barrels; substantially as described.

WALTER G. KING.
BURNHAM W. KING.

Witnesses:
H. ALBERTUS WEST,
C. J. KING.